C. M. CONRADSON.
HYDRAULIC VARIABLE SPEED TRANSMISSION.
APPLICATION FILED AUG. 7, 1913.

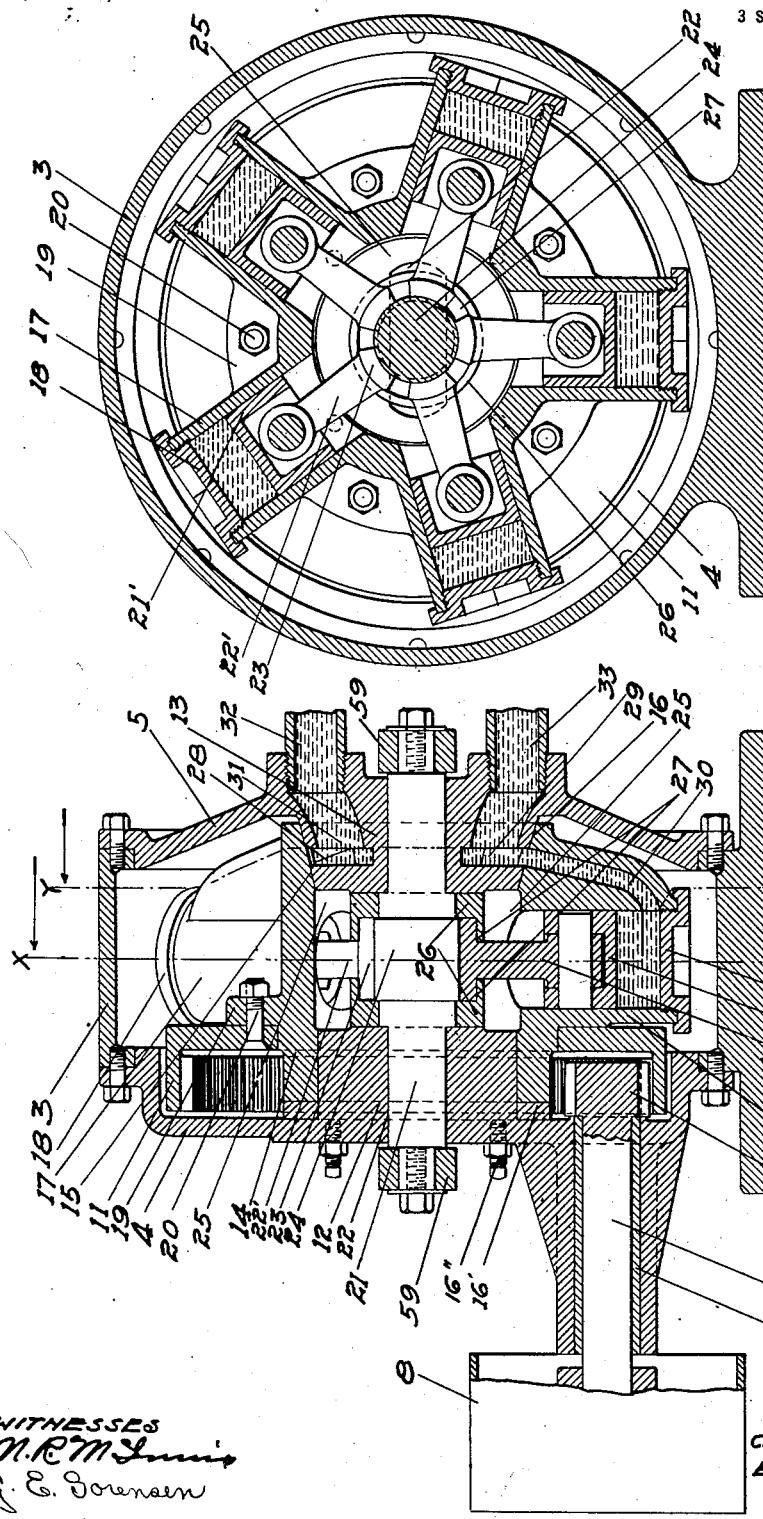

1,177,385.

Patented Mar. 28, 1916.
3 SHEETS—SHEET 2.

WITNESSES
M. R. McInnis
G. E. Sorensen

INVENTOR
CONRAD M. CONRADSON
BY Paul & Paul
ATTORNEYS

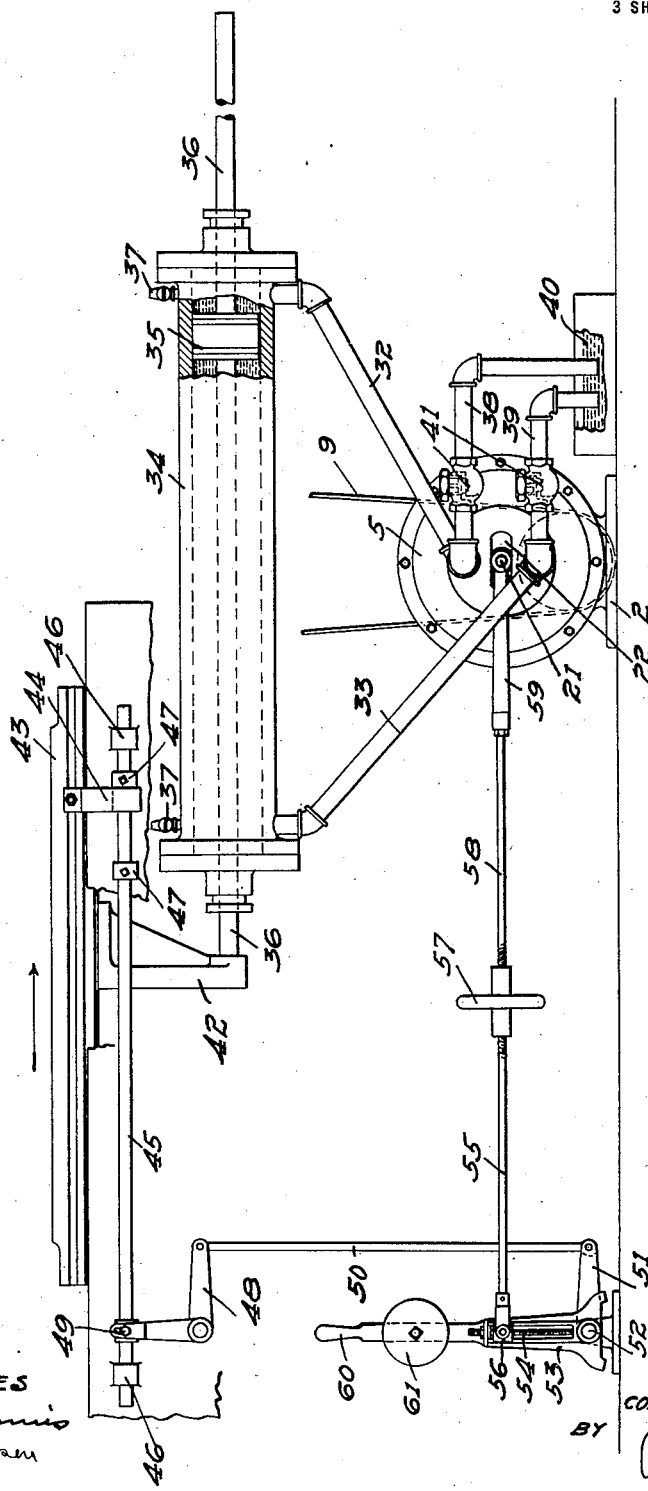

UNITED STATES PATENT OFFICE.

CONRAD M. CONRADSON, OF MADISON, WISCONSIN.

HYDRAULIC VARIABLE-SPEED TRANSMISSION.

1,177,385.

Specification of Letters Patent.

Patented Mar. 28, 1916.

Application filed August 7, 1913. Serial No. 783,528.

*To all whom it may concern:*

Be it known that I, CONRAD M. CONRADSON, citizen of the United States, resident of Madison, county of Dane, State of Wisconsin, have invented certain new and useful Improvements in Hydraulic Variable-Speed Transmission, of which the following is a specification.

The object of my invention is to provide for a continuous reciprocating motion at a variable speed in both directions, and of variable length of stroke by means of hydraulic transmission.

A further object is to provide a hydraulic transmission capable of application to a variety of uses, but designed particularly for operating the reciprocating bed or carriage of a planer, shaper, or similar machine.

The invention consists generally in various constructions and combinations, all as hereinafter described and particularly pointed out in the claims.

Figure 4:
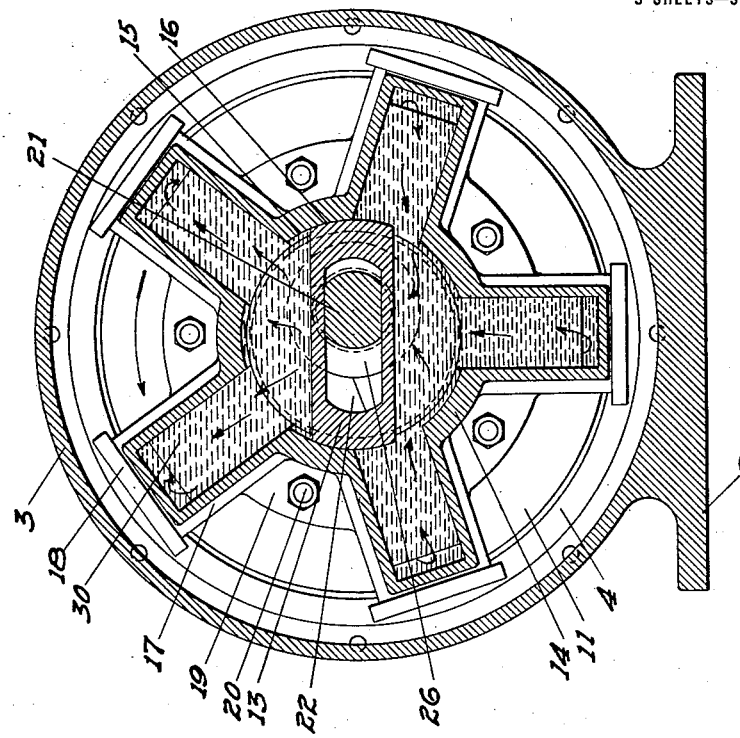
Figure 3:
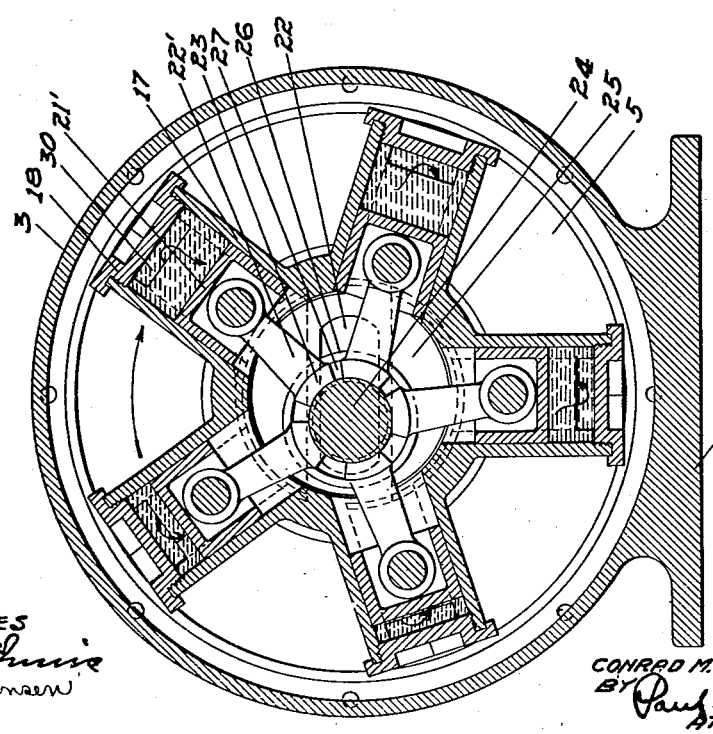

In the accompanying drawings forming part of this specification, Figure 1 is a vertical sectional view of a hydraulic pump apparatus embodying my invention, Fig. 2 is a similar view taken on section line *x—x* of Fig. 1, looking in the direction of the arrow, showing the plunger shaft of the cylinders in its central position, Fig. 3 is a similar view looking in the opposite direction and showing the shaft in its eccentric position, Fig. 4 is a sectional view, on the line *y—y* of Fig. 1, Fig. 5 illustrates the application of the hydraulic transmission to a reciprocating bed or carriage.

In the drawing, 2 represents the base of the pump, having a casing 3 mounted thereon provided with heads 4 and 5. The head 4 has a bearing 6 for a driven shaft 7 that is provided with a pulley 8, driven through a belt 9 (see Fig. 5) from a suitable source of power (not shown). A pinion 10 is provided at the inner end of the shaft 7 and a ring 11 encircles this pinion and is provided with an internal gear to mesh with the teeth of said pinion. The head 4 has a hub 12 centrally arranged thereon and the head 5 is provided with a hub 13. A sleeve 14 encircles the hub 12 and is free to turn thereon at one end and is provided at its opposite end with a tapered inner surface 15 which engages a similar surface 16 formed on the hub 13 and making an oil tight joint therewith. A ring 16' is preferably provided having adjusting screws 16" and adapted to bear on the end of the sleeve 14 for the purpose of taking up wear in the sleeve and its bearings. The sleeve 14 is provided with a series of cylinders 17 having heads 18, and between these cylinders, which are arranged at suitable intervals around the periphery of the sleeve, are webs 19 secured to the ring 11 by suitable means, such as bolts 20. A shaft 21 is mounted to slide in horizontal slots 22 provided in the hubs 12 and 13, said shaft being capable of adjustment from one side of the center of the heads 4 and 5 to the other side of the center thereof, and is therefore eccentric with respect to the axis of the heads 4 and 5 and their hubs. There may be any suitable number of the cylinders 17, but I have shown five of them in this case, from the use of which the desired results can be obtained. I do not, however, limit myself to this number.

Each cylinder is provided with a piston 21' having a connecting rod 22' provided with a T-head 23 that is adapted to bear on the cylindrical portion 24 of the shaft 21 at a point midway, substantially, between the ends of said shaft and between the hubs 12 and 13, a space 25 being provided between the cylinders and said shaft to accommodate the connecting rods 22' and permit freedom of revolution. The T-heads 23 bear on the shaft and are held in place thereon by means of rings 26 having recesses 27 to receive the heads 23 of the connecting rods. The connecting rods are thus held at all times in contact with the surface 24 to be actuated thereby.

The hub 13 is provided with chambers 28 and 29 and a series of ports 30 lead from these chambers into the outer portions of the cylinders 17. The cylinders and pistons revolve around the hubs 12 and 13 and the ports 30 communicate alternately with the chambers 28 and 29. In Fig. 4 I have illustrated the connection of the cylinders through the ports with these chambers when a group of five cylinders is employed, two of them communicating simultaneously with one chamber and the other three with the other chamber. This form of communication will, of course, be reversed continuously as the machine operates. The chamber 28 has a port 31 leading from the chamber 28 to a pipe 32 and a similar port leading from the chamber 29 to a pipe 33. These pipes will alternately act as supply and return pipes in the operation of converting the revolving movement of the pump to a reciprocating movement in the mechanism with which the pump is connected.

The pipes 32 and 33 lead to a stationary cylinder 34 having a piston 35 and rods 36 on each side thereof which slide in bearings in the end walls of the cylinder. By having the piston rods on each side of the piston 35 I am able to provide chambers on opposite sides of the piston of equal capacity. This arrangement allows an equal volume of inelastic fluid to flow into both chambers and avoids the necessity of a relief or reservoir chamber in connection with the cylinder. The cylinder is provided with suitable vent cocks 37. Pipes 38 and 39 lead from the pipes 32 and 33 to a pan 40. The chambers and cylinders within the pump, the cylinder 34 and the pipes 32 and 33 form a circulating system wherein a quantity of inelastic fluid such as oil, is placed.

To offset the leakage incidental to the operation of a machine of this type a pan 40 is preferably provided, supplied with oil, which is drawn into the system through the check valves 41 on the suction stroke of the pistons as they are successively connected with the pipes 38 and 39.

When the system is filled with oil and the shaft is shifted to an eccentric position, one group of the pistons will be moved outwardly to a point near the heads of their cylinders, while the pistons of the other group will be drawn inwardly away from the heads of their cylinders and consequently the oil forced out of the cylinders by the first group of pistons and into one end of the cylinder 34 will drive the piston 35 toward the other end of the cylinder 34 and force the oil in said other end through the pipe to the cylinders of the second group of pistons. The piston rod 36 is provided with an arm 42 attached to a reciprocating bed or carriage 43. An arm 44 is mounted on this carriage and adapted to slide over a rod 45 supported in guides 46 and provided with adjustable collars 47. A bell crank 48 has one arm loosely connected at 49 with the rod 45 and the other arm of the bell crank is connected by a rod 50 with an arm 51 mounted on a shaft 52 that is provided with an arm 53. A screw 54 is mounted in the arm 53 and a rod 55 is pivotally connected with a collar 56 which has a threaded connection with the screw 54 and is capable of adjustment up and down thereon. The adjustment of the collar 56 on the screw 54 toward or from the shaft 52 obviously will regulate the longitudinal movement of the rods 55 and 58 and the stroke of the shaft 21. The rod 55 is connected by a turn buckle 57 with a rod 58 having a forked end 59 that is mounted on the projecting ends of the shaft 21 to move said shaft to an eccentric or concentric position when said rod 58 is actuated by the rocking of the bell crank 48. This rocking occurs through the contact of the arm 44 with either one of the collars 47, the rod having a limited longitudinal movement in both directions to shift the shaft 21 and change the position of the groups of pistons with respect to their cylinders. The degree of eccentricity of the shaft 21 regulates the speed of the piston 35 in the stationary cylinder and the stroke of the revolving cylinder pistons. In other words, the nearer the shaft 21 is adjusted to its central or concentric position with respect to the revolving cylinders, the slower the movement of the piston 35, and the farther the shaft is moved from its center, the greater will be the speed of the piston 35. The length of the stroke of the piston 35 and of the reciprocating bed to which it is attached is varied by means of the adjustment of the collars 47 on the rod 45. Obviously, the nearer these collars are adjusted to one another, the shorter will be the stroke of the piston, and the farther they are moved apart the longer the stroke of the piston. At the end of each stroke, the sliding shaft forming the axis of the revolving cylinder piston rods will be shifted and the movement of the piston 35 reversed and this will continue automatically as long as the pump cylinders and pistons are revolved. I am thus able, by applying a constant speed to the pump, to convert a rotary to a continuous reciprocating movement and at a variable speed.

I may operate the rod 55 through a lever 60 instead of operating it through the rod 45 and the collars 47, and I also prefer to provide a weight 61 in the arm 53 to insure the positive movement of the shifting mechanism past the center in each direction.

I do not wish to be confined to the means shown for connecting the pump with the reciprocating bed, as in various ways this mechanism may be modified and still be within the scope of my invention.

I claim as my invention:

1. A hydraulic variable speed transmission comprising a casing, a plurality of cylinders mounted to revolve therein, a shaft having bearings at its ends in said casing, connecting rods having bearings on said shaft intermediate to the ends thereof and pistons in said cylinders, said shaft being normally concentric with the axis of said cylinders but capable of lateral adjustment in guides in said casing to an eccentric position to increase or decrease the stroke of said pistons, a stationary cylinder having a piston and ports on each side thereof communicating with said revolving cylinders and forming therewith a circulating system adapted to contain an inelastic fluid, and means for moving said shaft to reverse the stroke of said revolving cylinder pistons.

2. In a hydraulic variable speed transmission, a casing, heads therefor having inwardly projecting hubs provided with radial slots therein, a shaft mounted to slide laterally in said slots, a plurality of cylinders mounted to revolve around said hubs, pistons for said cylinders and connecting rods therefor having bearings on said shaft, said casing having chambers formed therein between said cylinders and said shaft, one of said heads having ports therein and ducts leading from said ports to said chambers and communicating therethrough with said cylinders, and means for shifting said shaft to an eccentric position with respect to the axis of said cylinders to vary the stroke of said pistons.

3. The combination, with a stationary casing having opposing, inwardly projecting hubs provided with radial slots therein, a shaft mounted to slide laterally in said slots, a sleeve mounted to revolve on said hubs, a plurality of radially arranged cylinders mounted on said sleeve to revolve therewith, pistons for said cylinders, connecting rods for said pistons having bearings on said shaft, said casing having chambers therein and ducts leading from said chambers to said cylinders, said cylinders being divided into two groups and said chambers communicating alternately with said groups as said cylinders revolve, means for shifting said shaft laterally with respect to the axis of said cylinders to vary the stroke of said pistons, and means reciprocated continuously by the movement of said pistons and at a variable speed by the shifting of said shaft.

4. A hydraulic pump comprising a casing and heads therefor, said heads having opposing hubs thereon, one of said hubs having a tapered bearing face, a sleeve journaled on said hubs and provided with a beveled face to engage the corresponding face of said hub, means for setting the tapered face of said sleeve against the corresponding face of said hub, a plurality of cylinders mounted on said sleeve, pistons therefor, a shaft having a radial movement in said hubs and whereon the rods of said pistons are journaled, means for revolving said sleeve and cylinders, and inelastic fluid supply pipes communicating with said cylinders.

5. The combination, with a casing having fluid supply and return ports, of a member mounted to revolve within said casing provided with a plurality of cylinders and ducts leading from said cylinders to said ports, said member having a tapered bearing on the walls of said ports and forming a fluid tight joint therewith, pistons for said cylinders, and connecting rods therefor, an axis whereon said connecting rods are mounted, said axis having a movement in said revolving member transversely with respect to the center thereof, to vary the stroke of said pistons.

6. A rotary pump comprising a casing having a head provided with intake and return ports therein, a revolving member provided with a plurality of cylinders and ducts therein arranged to communicate alternately with said ports and having a bearing adjacent to said ports, means in the opposite head of said casing for seating said revolving member in said bearing to take up wear, pistons for said cylinders and connecting rods therefor, the axis of said connecting rods having bearings at each end in said casing and being adjustable transversely of said member and said head for varying the stroke of said pistons.

7. A device of the class described comprising a casing having heads and slots therein, a revolving member journaled between said heads and having a plurality of cylinders and fluid ducts leading therefrom, one of said heads having ports communicating alternately with said ducts as said member revolves, an axis mounted to move in said slots from one side to the other of said revolving member and pistons for said cylinders having connecting rods mounted on said axis and means for shifting said axis to vary the stroke of said pistons.

8. A hydraulic variable speed transmission comprising a rotary pump including fluid supply and return pipes, a revolving member having a plurality of cylinders and ducts therefor arranged to communicate alternately with said supply and return pipes, pistons for said cylinders, an axis movable transversely of said pump and having a bearing for said pistons, and means for shifting said axis to vary the stroke of said pistons and a reciprocating member communicating with said pipe connections and arranged to actuate said shifting means to reverse the stroke of said pistons.

9. A hydraulic variable speed transmission comprising a casing having a head provided with chambers therein and supply and return pipes therefor, a member mounted to revolve within said casing and having a plurality of cylinders and ports leading to said cylinders arranged to alternately communicate with said chambers, a shaft having bearings in said casing and movable transversely thereof across the center of the axis of said cylinders, pistons for said cylinders having connecting rods mounted on said shaft, the adjustment of said shaft varying the stroke of said pistons, a cylinder communicating with said supply and return pipes, a reciprocating piston for said cylinder and means actuated through the movement of said reciprocating piston for shifting the position of said shaft to reverse the stroke of said revolving pistons.

10. A rotary pump comprising a casing and heads therefor, one of said heads having supply and return ports, a member mounted to revolve between said heads and having bearings thereon, said member having a gear ring thereon within said casing, a driving shaft having a pinion meshing with said gear ring, said member having a plurality of radially arranged cylinders therein and ducts therefor arranged to communicate alternately with said ports, pistons for said cylinders and connecting rods therefor, the axis of said connecting rods being adjustable transversely of said heads for varying the stroke of said pistons.

11. A rotary pump comprising a casing provided with a head having supply and return ports, a member mounted to revolve within said casing and having a plurality of cylinders provided with ducts arranged to communicate alternately with said ports, a shaft having bearings at its ends in said casing and movable transversely thereof, pistons for said cylinders, and connecting rods therefor, said connecting rods having end portions adapted to bear on the middle portion of said shaft and means encircling said shaft and engaging said end portions for holding them thereon while allowing freedom of oscillation of said connecting rods to accommodate themselves to the varying positions of said pistons, and means for shifting said shaft to vary the stroke of said pistons.

12. A rotary pump comprising a casing having a head provided with supply and return ports, a member mounted to revolve within said casing and having a plurality of cylinders and ducts therefor arranged to communicate alternately with said ports, a shaft having bearings at its ends in said casing and mounted to move transversely thereof across the axis of said revolving member, pistons for said cylinders and connecting rods therefor, having T-shaped heads seated on the middle portion of said shaft and rings encircling said shaft and engaging said T-shaped heads and means for shifting said shaft to vary the stroke of said pistons.

13. A hydraulic variable speed transmission comprising a rotary pump operated at a constant speed and including revolving cylinders and pistons and connecting rods having a common axis, a reciprocating member having pipe connections with said cylinders for fluid pressure circulation, means actuated by the movement of said member in both directions and having a forked connection with the ends of the axis of said connecting rods to shift it laterally and reverse the stroke of said pistons, said actuated means having a part for increasing the momentum of said means and insuring the completion of its stroke when actuated by said reciprocating member.

14. A hydraulic variable speed transmission comprising a rotary pump operated at constant speed and including revolving cylinders and pistons and connecting rods having a common axis, a reciprocating member having pipe connections with said cylinders for fluid pressure circulation, a rockshaft, a lever mounted on said shaft and connected with the axis of said connecting rods and actuated by the movement of said member in both directions for shifting the axis of said rods to reverse the stroke of said piston, and a weight adjustably mounted on said lever, for the purpose specified.

15. A hydraulic variable speed transmission comprising a pump having cylinders and pistons and connecting rods therefor, a reciprocating member having pipe connections with said cylinders for fluid pressure circulation, a rock shaft, a rod connected to said piston rods and to said shaft and adjustable toward and from the axis of said shaft, for varying the stroke of said piston rods, and means connected with said shaft and disposed in the path of said reciprocating member to be actuated thereby to reverse the member.

In witness whereof, I have hereunto set my hand this 31st day of July, 1913.

CONRAD M. CONRADSON.

Witnesses:
   FRED. ARNOLD,
   F. McDONOUGH, Jr.